US007765163B2

(12) United States Patent
Ludtke et al.

(10) Patent No.: US 7,765,163 B2
(45) Date of Patent: Jul. 27, 2010

(54) SYSTEM AND METHOD FOR CONDUCTING SECURE TRANSACTIONS OVER A NETWORK

(75) Inventors: Harold Aaron Ludtke, San Jose, CA (US); L. Michael Maritzen, Fremont, CA (US)

(73) Assignees: Sony Corporation (JP); Sony Electronics Inc., Park Ridge, NJ (US)

( * ) Notice: Subject to any disclaimer, the term of this patent is extended or adjusted under 35 U.S.C. 154(b) by 952 days.

(21) Appl. No.: 10/014,112

(22) Filed: Dec. 11, 2001

(65) Prior Publication Data
US 2002/0128980 A1  Sep. 12, 2002

Related U.S. Application Data

(60) Provisional application No. 60/255,004, filed on Dec. 12, 2000.

(51) Int. Cl.
*G06Q 20/00* (2006.01)
(52) U.S. Cl. .......................................... 705/67; 713/186
(58) Field of Classification Search .................. 705/65, 705/75, 26, 67; 382/115; 235/382; 714/752; 713/150–194
See application file for complete search history.

(56) References Cited

U.S. PATENT DOCUMENTS

| 4,582,985 | A | 4/1986 | Löfberg |
| 4,766,293 | A | 8/1988 | Boston |
| 4,805,222 | A | 2/1989 | Young et al. |
| 4,816,653 | A | 3/1989 | Anderl et al. |
| 5,056,019 | A | 10/1991 | Schultz et al. |
| 5,131,038 | A | 7/1992 | Puhl et al. |
| 5,173,851 | A | 12/1992 | Off et al. |
| 5,221,838 | A | 6/1993 | Gutman et al. |
| 5,256,863 | A | 10/1993 | Ferguson et al. |
| 5,276,736 | A | 1/1994 | Chaum |

(Continued)

FOREIGN PATENT DOCUMENTS

EP  1 033 687 A2  9/2000

(Continued)

OTHER PUBLICATIONS

U.S. Appl. No. 10/014,960, filed Dec. 11, 2001, entitled "Method or System for Executing Deferred Transactions".

(Continued)

*Primary Examiner*—Andrew J. Fischer
*Assistant Examiner*—Jamie Kucab
(74) *Attorney, Agent, or Firm*—Lerner, David, Littenberg, Krumholz & Mentlik, LLP

(57) ABSTRACT

A system and method for effecting a transaction between a person and a provider of goods or services over a network are provided. The method includes establishing, from a communication device, a communication link over the network with the provider, entering into the communication device information pertinent to effecting the transaction and activating in conjunction with effecting the transaction a biometric device to generate a unique identification trait (UIT) associated with the person. The method further includes, in response this activating, automatically transmitting from the communication device over the network to the provider both the information and a signal corresponding to the UIT. This signal may be a coded or uncoded signal verifying the person's identity. A communication device for performing this method also is provided.

11 Claims, 7 Drawing Sheets

U.S. PATENT DOCUMENTS

| | | | |
|---|---|---|---|
| 5,280,527 A * | 1/1994 | Gullman et al. | 713/184 |
| 5,323,146 A | 6/1994 | Glaschick et al. | |
| 5,329,589 A | 7/1994 | Fraser et al. | |
| 5,436,972 A | 7/1995 | Fischer | |
| 5,457,747 A | 10/1995 | Drexler et al. | |
| 5,461,217 A | 10/1995 | Claus | |
| 5,475,758 A | 12/1995 | Kikuchi et al. | |
| 5,521,362 A | 5/1996 | Powers | |
| 5,521,890 A | 5/1996 | Miche et al. | |
| 5,537,314 A | 7/1996 | Kanter | |
| 5,545,139 A | 8/1996 | Kriesel | |
| 5,550,358 A | 8/1996 | Tait et al. | |
| 5,557,518 A | 9/1996 | Rosen | |
| 5,557,541 A | 9/1996 | Schulhof et al. | |
| 5,561,709 A | 10/1996 | Remillard | |
| 5,594,230 A | 1/1997 | Waite et al. | |
| 5,598,474 A | 1/1997 | Johnson | |
| 5,604,805 A | 2/1997 | Brands | |
| 5,615,277 A | 3/1997 | Hoffman | |
| 5,623,552 A | 4/1997 | Lane | |
| 5,650,761 A | 7/1997 | Gomm et al. | |
| 5,661,807 A | 8/1997 | Guski et al. | |
| 5,696,827 A | 12/1997 | Brands | |
| 5,710,887 A | 1/1998 | Chelliah et al. | |
| 5,712,913 A | 1/1998 | Chaum | |
| 5,734,838 A | 3/1998 | Robinson et al. | |
| 5,737,701 A | 4/1998 | Rosenthal et al. | |
| 5,744,787 A | 4/1998 | Teicher | |
| 5,748,737 A | 5/1998 | Daggar | |
| 5,761,308 A | 6/1998 | Torii et al. | |
| 5,778,068 A | 7/1998 | Johnson et al. | |
| 5,778,384 A | 7/1998 | Provino et al. | |
| 5,796,832 A * | 8/1998 | Kawan | 705/65 |
| 5,809,212 A | 9/1998 | Shasha | |
| 5,815,665 A | 9/1998 | Teper et al. | |
| 5,825,876 A | 10/1998 | Peterson, Jr. | |
| 5,838,812 A * | 11/1998 | Pare et al. | 382/115 |
| 5,841,871 A | 11/1998 | Pinkas et al. | |
| 5,856,659 A | 1/1999 | Drupsteen et al. | |
| 5,870,723 A | 2/1999 | Pare, Jr. et al. | |
| 5,878,138 A | 3/1999 | Yacobi | |
| 5,878,139 A | 3/1999 | Rosen | |
| 5,878,235 A | 3/1999 | Porterfield et al. | |
| 5,884,271 A | 3/1999 | Pitroda | |
| 5,884,272 A | 3/1999 | Walker et al. | |
| 5,887,140 A | 3/1999 | Itsumi et al. | |
| 5,892,900 A | 4/1999 | Ginter et al. | |
| 5,897,622 A | 4/1999 | Blinn et al. | |
| 5,903,721 A | 5/1999 | Sixtus | |
| 5,915,022 A | 6/1999 | Robinson et al. | |
| 5,917,913 A | 6/1999 | Wang | |
| 5,923,016 A | 7/1999 | Fredregill et al. | |
| 5,926,624 A | 7/1999 | Katz et al. | |
| 5,926,798 A | 7/1999 | Carter | |
| 5,936,220 A | 8/1999 | Hoshino et al. | |
| 5,943,423 A | 8/1999 | Muftic | |
| 5,945,652 A | 8/1999 | Ohki et al. | |
| 5,948,040 A | 9/1999 | DeLorme et al. | |
| 5,949,411 A | 9/1999 | Doerr et al. | |
| 5,956,699 A | 9/1999 | Wong et al. | |
| 5,960,411 A * | 9/1999 | Hartman et al. | 705/26 |
| 5,966,704 A | 10/1999 | Furegati et al. | |
| 5,987,134 A | 11/1999 | Shin et al. | |
| 5,990,804 A | 11/1999 | Koyama | |
| 6,000,832 A | 12/1999 | Franklin et al. | |
| 6,002,770 A | 12/1999 | Tomko et al. | |
| 6,002,787 A | 12/1999 | Takhar et al. | |
| 6,003,014 A | 12/1999 | Lee et al. | |
| 6,006,200 A | 12/1999 | Boies et al. | |
| 6,009,415 A | 12/1999 | Shurling et al. | |
| 6,012,039 A | 1/2000 | Hoffman et al. | |
| 6,014,636 A | 1/2000 | Reeder | |
| 6,016,476 A | 1/2000 | Maes et al. | |
| 6,018,724 A | 1/2000 | Arent | |
| 6,021,496 A | 2/2000 | Dutcher et al. | |
| 6,023,679 A | 2/2000 | Acebo et al. | |
| 6,026,491 A | 2/2000 | Hiles | |
| 6,029,150 A | 2/2000 | Kravitz | |
| 6,035,403 A * | 3/2000 | Subbiah et al. | 726/28 |
| 6,047,268 A | 4/2000 | Bartoli et al. | |
| 6,047,269 A | 4/2000 | Biffar | |
| 6,073,124 A * | 6/2000 | Krishnan et al. | 705/59 |
| 6,076,075 A | 6/2000 | Teicher | |
| 6,078,891 A | 6/2000 | Riordan et al. | |
| 6,085,178 A | 7/2000 | Bigus et al. | |
| 6,088,731 A | 7/2000 | Kiraly et al. | |
| 6,105,010 A | 8/2000 | Musgrave | |
| 6,108,644 A | 8/2000 | Goldschlag et al. | |
| 6,119,096 A | 9/2000 | Mann et al. | |
| 6,122,737 A | 9/2000 | Bjorn et al. | |
| 6,128,602 A | 10/2000 | Northington et al. | |
| 6,129,274 A | 10/2000 | Suzuki | |
| 6,138,911 A | 10/2000 | Fredregill et al. | |
| 6,141,754 A | 10/2000 | Choy | |
| 6,148,241 A | 11/2000 | Ludtke et al. | |
| 6,151,600 A | 11/2000 | Dedrick | |
| 6,163,772 A | 12/2000 | Kramer et al. | |
| 6,167,517 A * | 12/2000 | Gilchrist et al. | 713/186 |
| 6,182,076 B1 * | 1/2001 | Yu et al. | 707/10 |
| 6,226,618 B1 | 5/2001 | Downs et al. | |
| 6,260,021 B1 * | 7/2001 | Wong et al. | 705/2 |
| 6,263,446 B1 | 7/2001 | Kausik et al. | |
| 6,269,348 B1 * | 7/2001 | Pare et al. | 705/39 |
| 6,270,011 B1 * | 8/2001 | Gottfried | 235/379 |
| 6,279,112 B1 | 8/2001 | O'Toole et al. | |
| 6,282,653 B1 | 8/2001 | Berstis et al. | |
| 6,289,323 B1 | 9/2001 | Gordon et al. | |
| 6,310,966 B1 * | 10/2001 | Dulude et al. | 382/115 |
| 6,314,196 B1 | 11/2001 | Yamaguchi et al. | |
| 6,353,811 B1 | 3/2002 | Weissman | |
| 6,356,905 B1 | 3/2002 | Gershman et al. | |
| 6,366,953 B2 | 4/2002 | Inoue | |
| 6,370,629 B1 | 4/2002 | Hastings et al. | |
| 6,434,535 B1 | 8/2002 | Kupka et al. | |
| 6,453,301 B1 * | 9/2002 | Niwa | 705/65 |
| 6,529,885 B1 | 3/2003 | Johnson | |
| 6,556,976 B1 | 4/2003 | Callen | |
| 6,560,741 B1 * | 5/2003 | Gerety et al. | 714/752 |
| 6,574,607 B1 | 6/2003 | Carter et al. | |
| 6,578,014 B1 | 6/2003 | Murcko, Jr. | |
| 6,592,044 B1 | 7/2003 | Wong et al. | |
| 6,615,264 B1 | 9/2003 | Stoltz et al. | |
| 6,655,585 B2 * | 12/2003 | Shinn | 235/382 |
| 6,662,166 B2 | 12/2003 | Pare, Jr. et al. | |
| 6,687,390 B2 | 2/2004 | Avni et al. | |
| 0,044,627 A1 | 3/2004 | Russell et al. | |
| 6,871,287 B1 * | 3/2005 | Ellingson | 726/9 |
| 6,910,132 B1 | 6/2005 | Bhattacharya | |
| 6,941,462 B1 | 9/2005 | Tsukamura et al. | |
| 6,968,453 B2 | 11/2005 | Doyle et al. | |
| 7,181,297 B1 | 2/2007 | Pluvinage et al. | |
| 7,188,110 B1 * | 3/2007 | Ludtke et al. | 707/10 |
| 7,251,633 B2 | 7/2007 | Ludtke et al. | |
| 7,565,541 B1 | 7/2009 | Tarbouriech | |
| 7,613,659 B1 | 11/2009 | Hoffman et al. | |
| 2001/0045458 A1 | 11/2001 | Polansky | |
| 2001/0449061 | 11/2001 | Kanevsky et al. | |
| 2001/0051996 A1 | 12/2001 | Cooper et al. | |
| 2002/0123971 A1 | 9/2002 | Maritzen et al. | |
| 2002/0147914 A1 | 10/2002 | Arnold | |
| 2002/0191816 A1 * | 12/2002 | Maritzen et al. | 382/115 |
| 2004/0177097 A1 * | 9/2004 | Yu et al. | 707/104.1 |

| | | | |
|---|---|---|---|
| 2004/0199469 | A1* | 10/2004 | Barillova et al. .............. 705/44 |

FOREIGN PATENT DOCUMENTS

| EP | 1 085 424 A1 | 3/2001 |
|---|---|---|
| JP | 9722857 | 2/1997 |
| JP | 9978521 | 3/1999 |
| JP | 99164179 | 6/1999 |
| WO | WO-95/13591 | 5/1995 |
| WO | WO 99/06928 | 2/1999 |
| WO | WO-01/08055 A1 | 2/2001 |
| WO | WO-01/22351 A1 | 3/2001 |
| WO | WO-01/50428 A1 | 7/2001 |
| WO | WO-01/59732 A2 | 8/2001 |

OTHER PUBLICATIONS

U.S. Appl. No. 10/015,070, filed Dec. 11, 2001, entitled "Method and System of Conducting Network-Based Transactions".

U.S. Appl. No. 09/483,584, filed Dec. 11, 2000, entitled "Secure Electronic Commerce System".

Drury; Demand Jumps for High-Tech ID Producer, Business First; Oct. 22, 2001; vol. 18, No. 3, p. 1.

Pack: "Traditional Retailers Plan Interactive Stores", Orlando Sentinel, May 25, 1995.

U.S. Appl. No. 10/014,112, filed Dec. 11, 2001, entitled "System and Method for Conducting Secure Transactions Over a Network".

U.S. Appl. No. 10/015,070, filed Dec. 11, 2001, entitled "Method and System of Conducting Network-Based Transactions".

U.S. Appl. No. 09/483,584, filed Dec. 11, 2000, entitled "Secure Electronic Commerce System".

U.S. Appl. No. 10/014,960, filed Dec. 11, 2001, entitled "Method and System for Executing Deferred Transactions".

Co-pending U.S. Appl. No. 09/466,965, Authentication System, Fingerprint Identification Unit, and Authentication Method, filed Dec. 20, 1999.

McKendrick, Joseph, Creating a Password for Life from the Tip of a Finger, Nov. 31, 1999, ent, v4, n19, p. 22.

Crawford, Sharon, "Windows 2000 Pro: The Missing Manual" ā2000 O'Reilly Media Inc Excerpts from Chapters 9 & 13 (32 pages total).

Delio, Michelle. "PC Expo: It's All About the Hand" Published Jun. 27, 2000 by wired.com (2 pages) http://www.wired.com/print/science/discoveries/news/2000/06/37266.

Sommefeldt, Ryszard "Compaq iPAQ H3630 PocketPC Review". Published Jan. 23, 2001 by hexus.net (7 pages) http://www.hexus.net/content/item_print.php?item=130.

"Ethenticator MS 3000" product page from ethentica.com. Observed by the Internet Archive on Aug. 15, 2000 (2 pages) http://web.archive.org/web/20000815235523/www.ethentica.com/ms3000.pdf.

"Expansion Packs" product page from compaq.com Observed by the Internet Archive on Aug. 15, 2000 (2 pages) http://web.archive.org/web/20000815202017/www.compaq.com/products/handhelds/pocketpc/jackets.html.

Stephanie Izarek, Let's See Some ID, http://www.foxnews.com/vtech/122199/biometrics.sml, pp. 1-4 (dated Dec. 21, 1999).

\* cited by examiner

SYSTEM AND METHOD FOR CONDUCTING SECURE TRANSACTIONS OVER A NETWORK

CROSS-REFERENCE TO RELATED APPLICATIONS

This application claims the benefit of U.S. Provisional Patent Application No. 60/255,004 filed Dec. 12, 2000, the entire disclosure of which is incorporated herein by reference.

BACKGROUND OF THE INVENTION

The present invention relates to conducting secure transactions over a network. In particular, the present invention relates to a system and method for conducting secure transactions over a network in which the identity of a party to the transaction is verified.

Computer networks, such as the Internet, are used for a variety of commercial activities, such as banking transactions, stock trading and the purchasing of goods and services. The Internet in particular provides a vast new market, and significant new opportunities, for a wide variety of businesses.

A common method for conducting business transactions over the Internet, or over other computer networks, is to use a credit card to authorize and pay for the goods or services. A consumer, typically using a personal computer, cell phone, personal digital assistant (PDA) or other communications device, electronically connects to a provider of the goods or services. Using browser software, the consumer then reviews the provider's website, selects particular goods or services for purchase, and then provides personal and financial information to complete the transaction. Completing the transaction typically involves entering a name, address, credit card number, credit card expiration date and other information pertinent to the transaction. The consumer usually enters this information using a keyboard, mouse or other input device associated with the communications device. The provider typically requests credit authorization from an authorizing entity, such as a credit card company or bank, and, if such authorization is provided, the transaction is completed.

While this method is effective, it is subject to abuse and fraud. According to recent newspaper articles, the theft of information associated with a person's identity, such as a person's social security number, credit card number, driver's license number or passport number, has become a major problem. In particular, the theft of a person's credit card number is causing significant losses to providers of goods and services over the Internet. For example, in 1999, providers of goods and services over the Internet lost approximately 230 million dollars in revenues because of credit card fraud. Reducing such fraud is an important goal to the future of the Internet.

The use of biometric devices, such as fingerprint analyzers, iris scanners, etc., is known for verifying a person's identity. Biometric devices are not widely used for transactions with consumers, however, because of the additional burdens imposed upon consumers to use such devices. Accordingly, there is a need for a new method and system for using a biometric device to facilitate and authorize transactions with consumers and other parties, particularly transactions conducted over computer networks such as the Internet, in which the burdens imposed upon consumers and other parties to conduct such transactions are not increased.

SUMMARY OF THE INVENTION

In one aspect, the present invention provides a method for effecting a transaction between a person and a provider of goods or services over a computer network. The method includes establishing from a communication device a communication link over the computer network with the provider. The method also includes entering into the communication device information pertinent to effecting the transaction. The method further includes activating in conjunction with effecting the transaction a biometric device to generate a unique identification trait (UIT) associated with the person and, in response to this activating, automatically transmitting from the communication device over the computer network to the provider both the information and a signal corresponding to the UIT.

In another aspect, the present invention provides a communication device for effecting a transaction between a person and a provider of goods or services over a computer network. The communication device includes a network connection device for establishing from the communication device a communication link over the computer network with the provider. The communication device also includes a computer input device for entering into the communication device information pertinent to effecting the transaction. The communication device further includes a biometric device for activating by the person in conjunction with effecting the transaction to generate a UIT associated with the person and a processor, responsive to this activating, for automatically causing the transmission from the communication device over the computer network to the provider of both the information and a signal corresponding to the UIT.

DETAILED DESCRIPTION OF THE PREFERRED EMBODIMENTS

Figure 1:
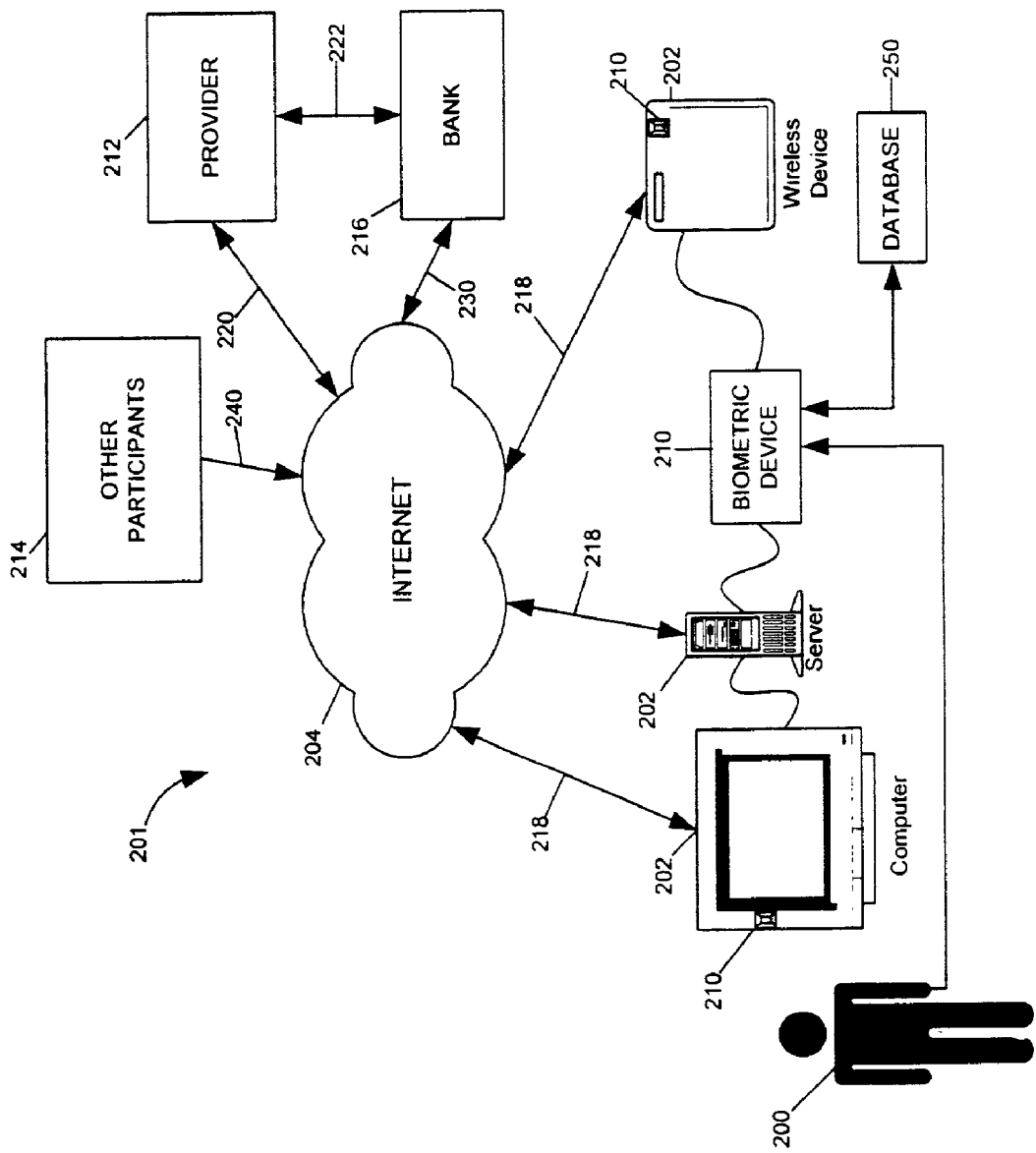
FIG. 1 illustrates a system for conducting secure transactions over a network in accordance with the present invention.

FIG. 1 illustrates a system 201 for conducting secure transactions over the Internet, or over other computer networks, in accordance with the present invention.

As shown in FIG. 1, consumer 200 uses one of a variety of communication devices 202 to connect to Internet 204 over links 218. Links 218 may be telephone lines, cable systems, optical systems, wireless systems, satellite systems, or any other systems capable of transmitting information between a communication device 202 and a computer network. A communication device 202 may be any device for transmitting and receiving such information. A communication device 202 typically includes a central processing unit (CPU) and a network connection device, e.g., a network adapter card, a network interface card, a standard cable modem, a DSL modem, an ADSL modem, an ISDN modem, a cable modem or a wireless modem. A communication device 202 may be, e.g., a wireless device, such as a personal digital assistant (PDA), cell phone, satellite broadcasting set-top box or a portable computer with a wireless modem. On the other hand, a communication device 202 may be a wired device, such as a personal computer, server, point-of-sale terminal, ATM machine, cable set-top box or land-line telephone. In lieu of Internet 204, any network capable of providing communications between and among such devices may be employed.

Using a communication device 202, consumer 200 accesses a provider, e.g., provider 212, over links 218, Internet 204 and, e.g., link 220. Provider 212 may be any entity providing goods or services over Internet 204, e.g., consumer goods, electronic banking, movies, stock trading, news, information or any other goods or services. Other participants 214, such as individuals, institutions and other entities, also interact with provider 212, other providers (not shown), consumer 200 and other consumers (not shown), over Internet 204. Bank 216 communicates with provider 212 over dedicated link 222 or link 230 and Internet 204. Bank 216 provides financial information, such as the verification of credit information, to provider 212 to assist provider 212 in conducting sales and other transactions.

In accordance with the present invention, a communication device 202 includes a biometric device 210. Biometric device 210 measures and analyzes a human characteristic, referred to herein as a unique identification trait (UIT). The UIT may be a fingerprint, retina pattern, iris pattern, scent pattern, voice pattern, DNA pattern, heat pattern, keystroke pattern, facial image or any other characteristic uniquely identifying an individual. Biometric device 210 compares an entered UIT of an individual against a copy of the UIT previously stored in a database 250 to authenticate the identity of the individual. The previously stored copy of the UIT normally is a digital representation of the UIT, and the comparison normally is performed by, e.g., a microprocessor, hard wired logic, ASIC or other digital processing device. Database 250 may be stored in a RAM, ROM, EEPROM, magnetic tape, floppy disk, optical disk or any other computer memory device associated with communication device 202. On the other hand, database 250 may be associated with provider 212, bank 216 or other participants 216 and connected to communication device 202 through Internet 204. The comparison of an entered UIT against a stored UIT normally involves creating a digital representation of the entered UIT, comparing that digital representation with the UIT stored for that individual and, if a match occurs, generating a verification signal. Of course, analog techniques also may be employed for this process. Such biometric devices are well known to those skilled in the art.

Figure 2:
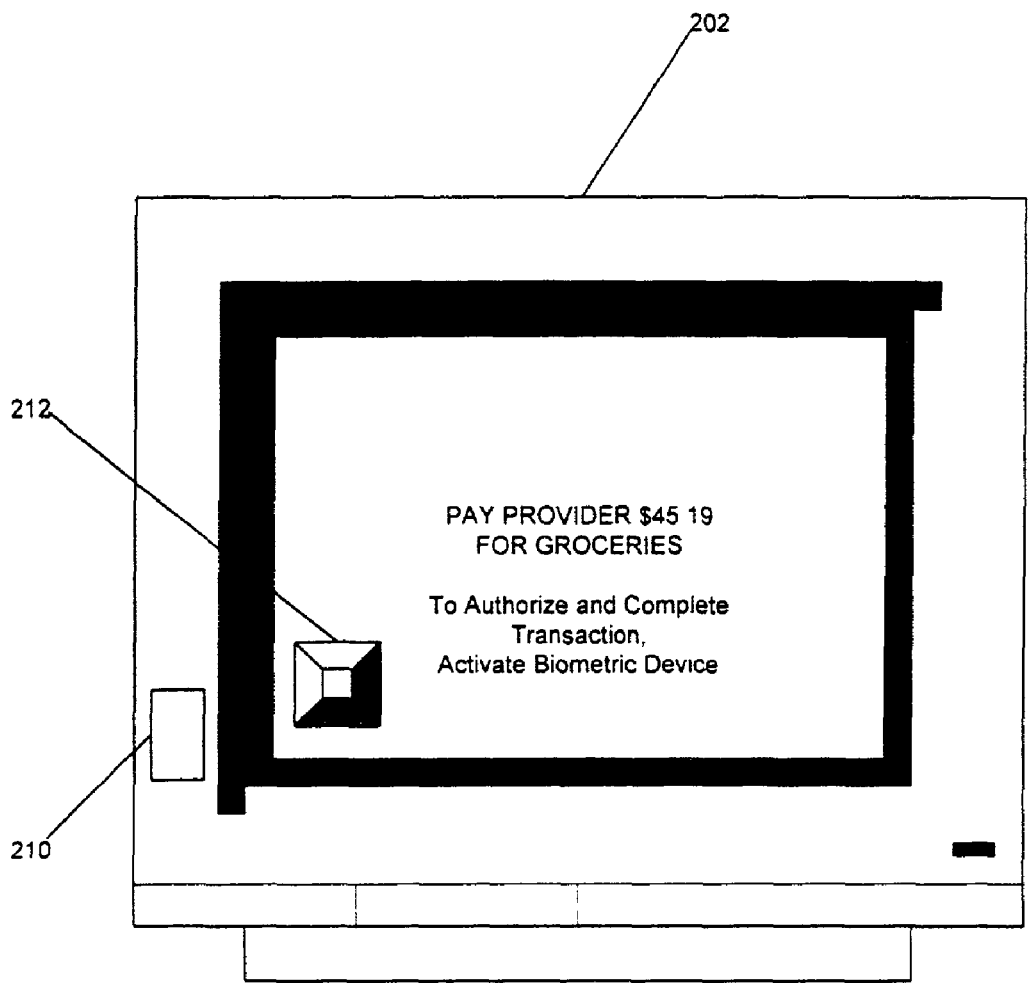
FIG. 2 illustrates a biometric device integrated into a communications device in accordance with the present invention.

As shown in FIG. 2, biometric device 210 may be integrated into a display cabinet associated with a communication device 202. Icon 212 provides a visual indication to a user that biometric device 210 should be activated in conjunction with completing a transaction. Biometric device 210 also may be integrated into a mouse, keyboard, case or display (using touch screen techniques) associated with a communication device 202. On the other hand, some components of biometric device 210 may be at provider 212, bank 216 or other participants 214 and connected to communication device 202 through Internet 204.

In accordance with the method of the present invention, a user, such as consumer 200, activates biometric device 210 in conjunction with conducting a transaction with provider 212 over Internet 204. This activation, however, does not increase the burdens imposed upon consumer 200 to conduct the transaction.

Figure 3:
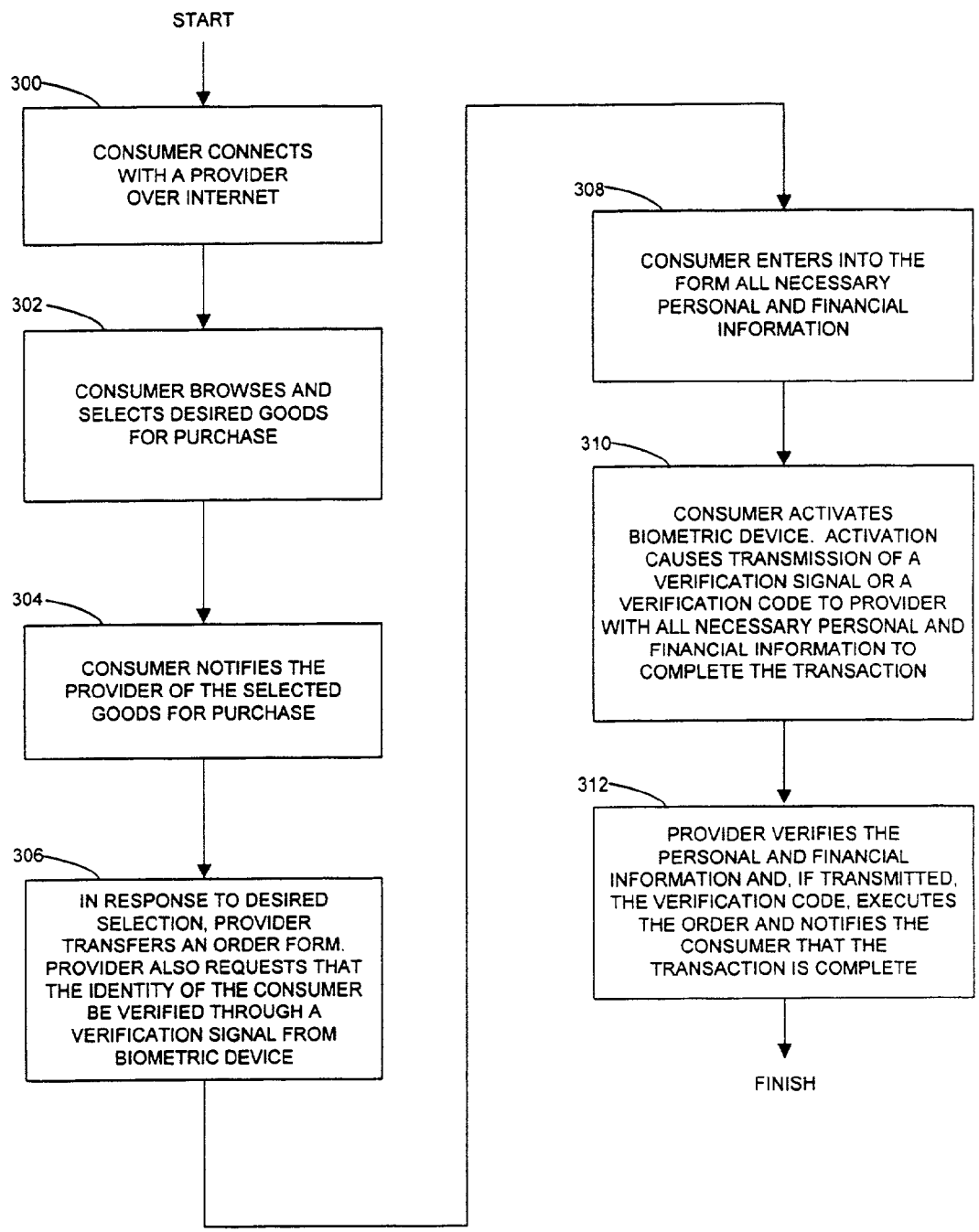
FIG. 3 is a flow diagram of a method in accordance with the present invention.

A flow diagram for conducting a transaction with a provider 212 of goods or services in accordance with the present invention is shown in FIG. 3. This example is equally applicable, however, to any entity conducting transactions with individuals or other entities over any other computer network.

Referring to FIG. 3, at action 300, consumer 200, using conventional methods, connects to provider 212 over Internet 204 using a communication device 202. At action 302, consumer 200 browses the website of provider 212 and selects desired goods for purchase. At action 304, consumer 200 notifies provider 212 of his or her selection of goods for purchase. This notification may occur, e.g., by clicking on an icon representing the goods, clicking on a picture of the goods or transmitting an appropriate message identifying the goods entered on a keyboard. At action 306, provider 212, in response, electronically transfers to consumer 200 a form requesting various personal and financial information to complete the transaction (e.g. name, address, quantity of goods, payment information, etc.). Provider 212 also requests that the identity of consumer 200 be verified through the transmission of a verification signal from biometric device 210.

In response, using communication device 202, consumer 200, at action 308, enters all of the necessary personal and financial information into the form. At action 310, consumer 200 activates biometric device 210. For example, if biometric device 210 is a fingerprint analyzer, consumer 200 would then place his or her finger in or on the sensor for such a device. If the UIT generated by biometric device 210 matches the UIT for consumer 200 stored in database 250, a verification signal is generated and transferred to provider 212. With this signal, and without further action by consumer 200, all of the personal and financial information entered into the form by consumer 200 at action 308 also are transmitted to provider 212. This information is transmitted to provider 212 with the verification signal without consumer 200 clicking on an icon, pressing a key on a keyboard or taking any other additional action to initiate this transmission. The step of verification using biometric device 200, therefore, does not add a step to the ordering process. At action 312, provider 212 receives the verification signal, verifies the personal and financial information transmitted, executes the order and notifies consumer 200 that the transaction is complete.

The verification signal may indicate only that the identity of consumer 200 has been verified. On the other hand, the verification signal may comprise a unique verification code, such as a number, password or other indicia uniquely associated with consumer 200. This verification code may be transmitted in encrypted or non-encrypted format. If a verification code is transmitted to provider 212, provider 212, in addition to verifying the personal and financial information of consumer 200, also may verify this code. For example, provider 212 may refer to a database maintained by it, or another entity, containing a compilation of such verification codes and the identity of the individuals to whom they correspond. Provider 212 then can determine whether the code transmitted is in this database and, if so, whether the identity of the individual to whom the code corresponds is consumer 200.

In the alternative, in lieu of a verification signal or a verification code, biometric device 210, upon activation, may transfer to provider 212, in addition to all of the personal and financial information entered into the form, the generated UIT. In this case, provider 212 would compare the generated UIT against the UITs stored in database 250 to verify the identity of consumer 200.

The method described above provides, therefore, an enhanced level of security for transactions conducted over the Internet, or over other computer networks, without imposing increased burdens upon consumers or other individuals for completing such transactions.

Figure 4:
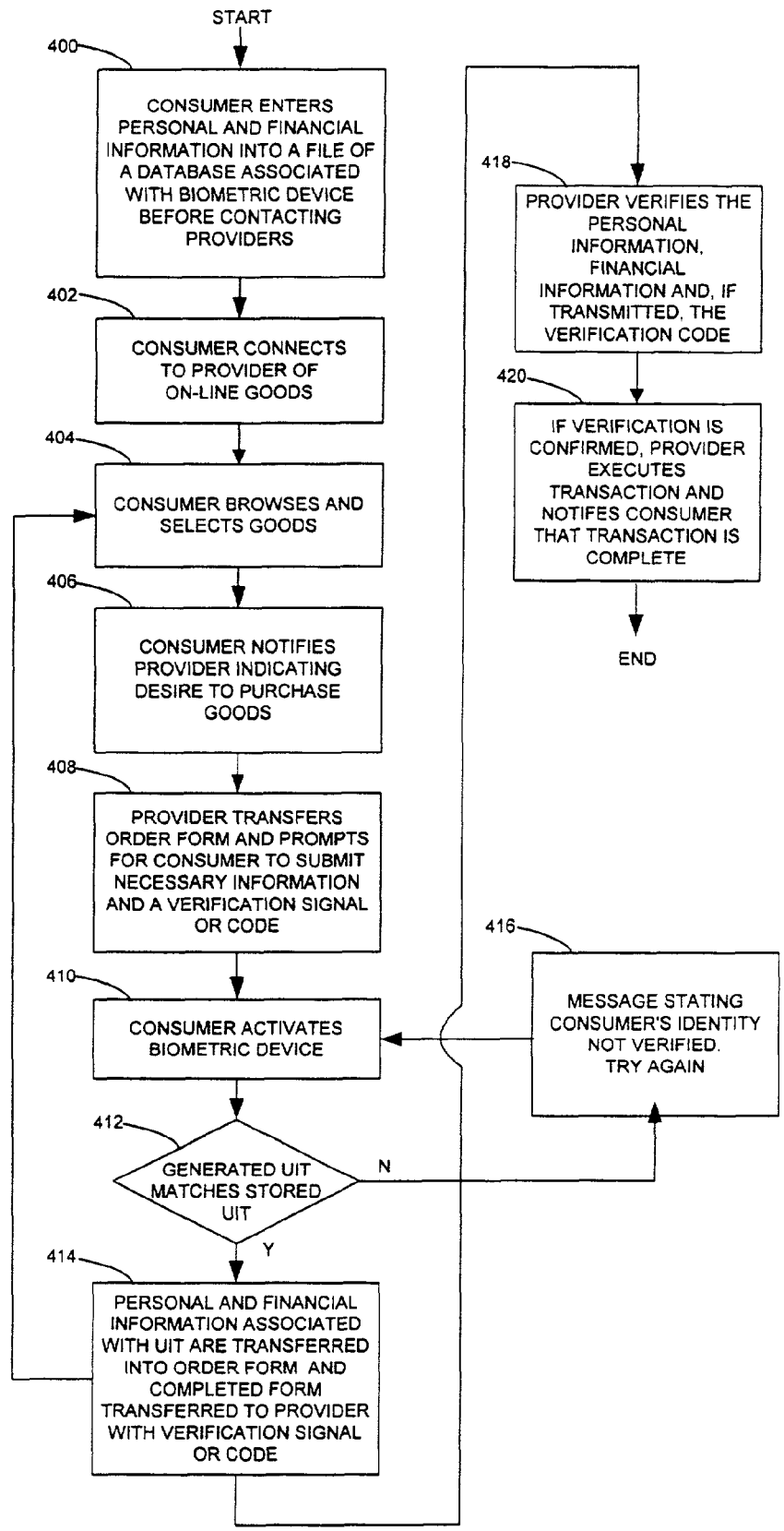
FIG. 4 is a flow diagram of an alternative method in accordance with the present invention.

An alternative method in accordance with the present invention is shown in FIG. 4. As shown in this figure, at action 400, before contacting a provider, such as provider 212, consumer 200 enters his or her personal and financial information into a file of a database, such as database 250, associated with the biometric device. This information may include the consumer's name, address, social security number, sex, date of birth, credit card number, password, bank name, shipping address, billing address, etc. This file is associated with a UIT of consumer 200 and, in addition, also may be associated with other information, e.g., a particular provider or providers, a particular credit card number, etc. As discussed below in connection with FIG. 5, database 250 may include a number of such files, each associated with a different UIT of consumer 200 or other individuals. Each of these files also may be further associated with other information, e.g., a different credit card number, a different provider or group of providers, etc.

Referring again to FIG. 4, at action 402, using communication device 202, consumer 200 connects to provider 212 using conventional techniques. At action 404, consumer 200 browses the website of provider 212 and selects particular goods or services for purchase. At action 406, consumer 200 notifies provider 212 of his or her desire to purchase particular goods, e.g., by clicking on a button, icon or picture of the goods, transmitting a message entered on a keyboard, etc. At action 408, provider 212 transfers an order form to communication device 202 and requests consumer 200 to provide all necessary personal and financial information to complete the transaction. Provider 212 also requests that consumer 200 provide a verification signal or a verification code.

In response to this request, consumer 200, at action 410, activates biometric device 210. At action 412, a determination is made of whether the generated UIT matches any of the UITs associated with the files in database 250. If no match is found, a message is displayed on the display of communication device 202 at action 416 telling consumer 200 that verification of his or her identity was not successful and that he or she may reactivate biometric device 210 again to again attempt verification. On the other hand, if at action 412, the UIT generated matches one of the UITs associated with the files in database 250, then, at action 414, without further action by consumer 200, the personal and financial information in the file associated with the UIT are automatically entered into the form, and the completed form and verification signal or verification code are transmitted to provider 212. If several files in database 250 correspond to the same UIT but different providers, then the file corresponding to provider 212 is transmitted.

At action 418, provider 212 verifies the personal information, financial information and, if transmitted, the verification code. At action 420, if verification is successful, provider 212 executes the transaction and notifies consumer 200 that the transaction is complete.

Figure 5:
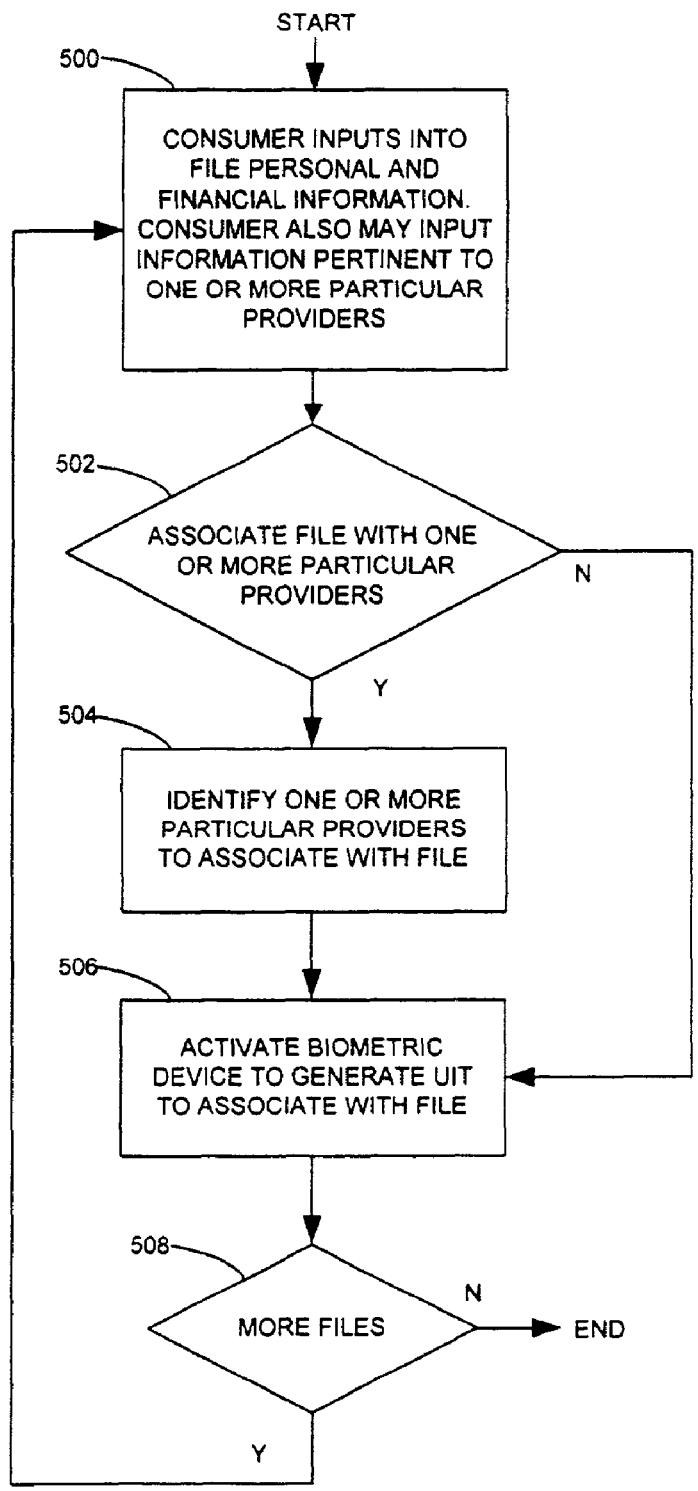
FIG. 5 is a flow diagram of a method for associating specific data files with specific unique identification traits of a person in accordance with the present invention.

FIG. 5 is a flow diagram of the steps for creating a group of files in database 250 in accordance with the method of FIG. 4. Each of these files is uniquely identified by a particular UIT of consumer 200 and perhaps also by particular UITs of other individuals. Each of these files also may be further uniquely identified by a particular provider or providers, credit card number or other information.

As shown in FIG. 5, consumer 200, using a keyboard or other computer input device associated with communication device 202, enters into a file of database 250 personal information, financial information and various other information for conducting transactions with provider 212 or other providers. This other information may include information pertinent to provider 212 or other providers, e.g., a particular pass code, sign-on routine, etc. At action 502, consumer 200 is asked whether the files should be associated with a particular provider or providers. If no such association is desired, consumer 200 moves to action 506. On the other hand, if such an association is requested, consumer 200 moves to action 504 where, again using a keyboard or other computer input device associated with communications device, he or she enters information identifying the particular provider or providers with which the file is to be associated. Consumer 200 then moves to action 506 where he or she activates biometric device 210. This activation causes a UIT to be generated and associated with the file. Consumer 200, at action 508, then is asked whether additional files for database 250 are to be created. If additional files are to be created, consumer 200 returns to action 500 where the information for the next file is entered. If no additional files are to be created, the program terminates.

Figure 6:
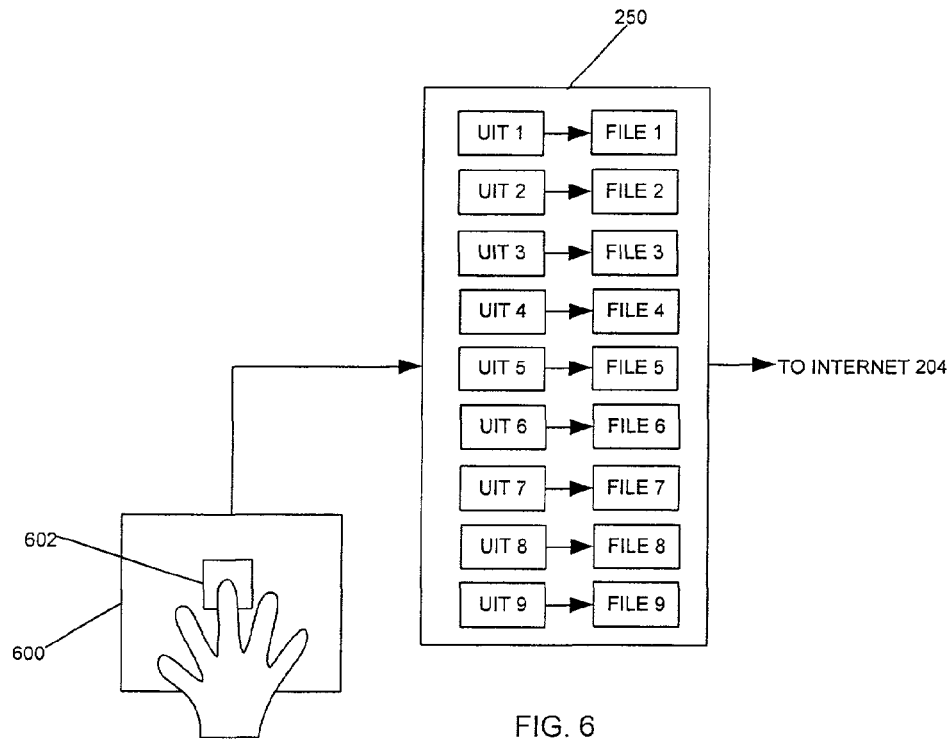
FIG. 6 illustrates a system for using specific data files associated with specific unique identification traits of a person in accordance with the present invention.
Figure 7:
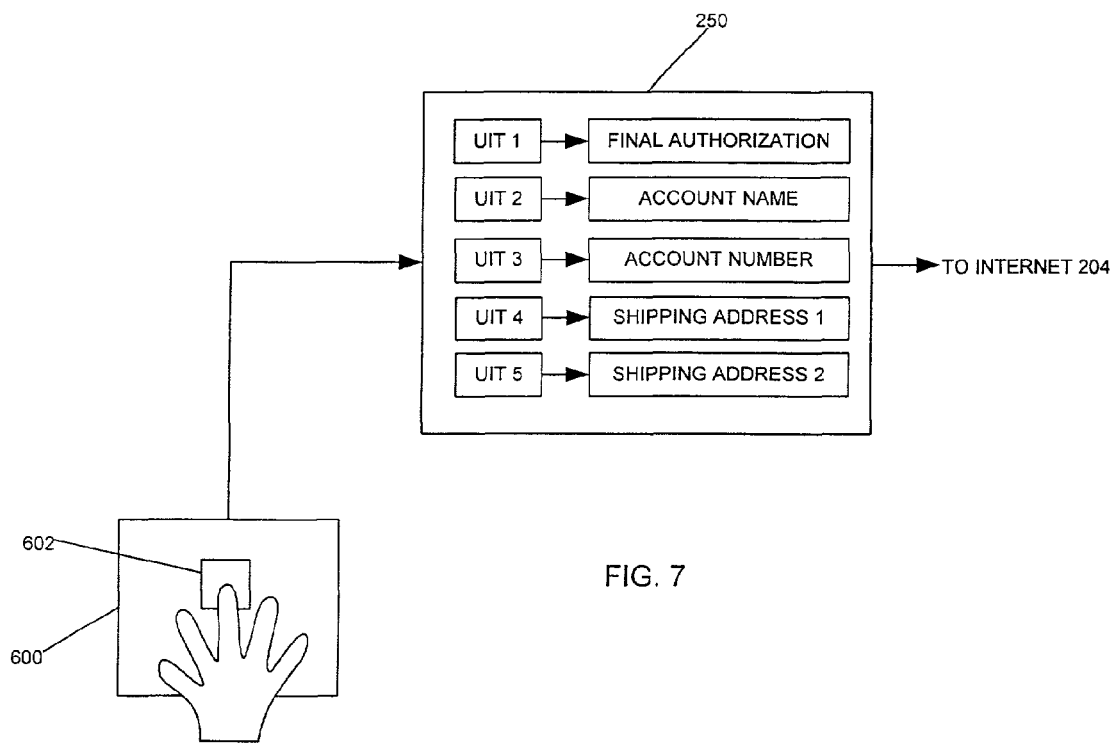
FIG. 7 illustrates an alternative embodiment of a system for using specific data files associated with specific unique identification traits of a person in accordance with the present invention.

FIGS. 6 and 7 illustrate the use of files created in accordance with the method illustrated in FIG. 5 in executing transactions over Internet 204 using communication device 202.

In the first example, as shown in FIG. 6, database 250 comprises a number of such files, and biometric device 210 comprises fingerprint analyzer 600. Each of the files is associated with a different fingerprint of consumer 200. For example, UIT 1, which is associated with file 1, may be the fingerprint of the right thumb of consumer 200, UIT 2, which is associated with file 2, may be the fingerprint of the right index finger of consumer 200, etc. Therefore, if in conjunction with executing a transaction with provider 212, consumer 200 is requested to transmit a verification signal or verification code and the information contained in file one, consumer 200 simply places his or her right thumb on sensor 602 of fingerprint analyzer 600. The verification signal or code, and the information contained in file one, then are transmitted automatically to provider 212 without further action by consumer 200. If consumer 200 is requested during a transaction with provider 212 to transmit a verification signal or verification code and the information contained in file two, consumer 200 simply places his or her right index finger on sensor pad 602. The verification signal or code, and the information contained in file two, then are transmitted automatically to provider 212 without further action by consumer 200.

In addition to a UIT, each of the files may be further associated with a particular provider or providers. For example, a first file may be associated with UIT 1 and provider 212, and a second file may be associated with UIT 1 and another provider. The identity of the particular provider with which communication device 202 is in communication during a transaction normally is known to communication device 202 under conventional communication protocols. Therefore, if in conjunction with executing a transaction with provider 212 consumer 200 is requested to transmit a verification signal or verification code and the information contained in the first file, when consumer 200 enters UIT 1, e.g., by placing his or her right thumb on sensor 602, the verification signal or code and the information in only the first file automatically are transmitted to provider 212.

Rather than each of these files containing all of the personal and financial information necessary to complete a transaction, subsets of this information may be included in the files. For example, as shown in FIG. 7, a first file associated with UIT 1 may contain only a final authorization signal for a transaction, a second file associated with UIT 2 may contain an account name, a third file associated with UIT 3 may contain an account number, a fourth file associated with UIT 4 may contain a first shipping address and a fifth file associated with UIT 5 may contain a second shipping address. If during a transaction with provider 212 or another provider, therefore, consumer 200 is requested to transmit a verification signal or a verification code and an account name, consumer 200 simply enters UIT 2, e.g., places his or her right index finger on sensor 602 of fingerprint analyzer 600. If consumer 200 merely wishes to submit with the verification signal or verification code a final authorization for the transaction, consumer 210 simply enters UIT 1, e.g., places his or her right thumb on sensor 602. Of course, if additional biometric devices are employed, such as retinal scanners, voice recognition devices, etc., additional files can be stored in database 250 in this manner or as shown in FIG. 6, and each of these additional files may be associated with the particular UITs of consumer 200 or other individuals corresponding to these devices.

Figure 8:
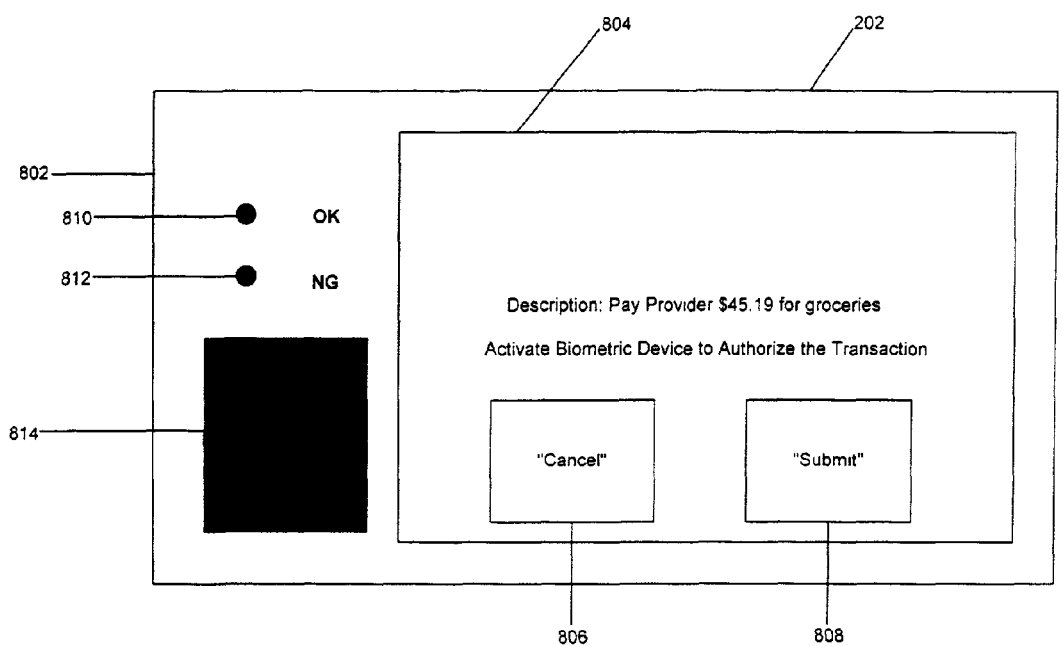
FIG. 8 illustrates a user's interface for a biometric device and a communications device in accordance with the present invention.

FIG. 8 illustrates an example of a user's interface for biometric device 210 and communication device 202 for operation in accordance with the present invention. In this example, communication device 202 typically is, e.g., a point-of-sale terminal or a wireless communication device, such as a PDA.

As shown in this figure, display 804 of communication device 202 provides various prompts and instructions to consumer 200 for completing a transaction. Fingerprint analyzer 814 is integrated into case 802 of communication device 202. LEDs 810 and 812 provide signals when biometric device 210 is activated to indicate whether verification of consumer 200 is successful (OK) or unsuccessful (NG). Icons 806 and 808 appearing in display 804 provide signals to consumer 202 to assist him or her in completing a transaction. If display 804 includes a touch-sensitive screen, responses to these signals may be transmitted by touching these icons. In the alternative, responses may be transmitted using a mouse, keyboard or other computer input device. Also, in lieu of LEDs 810 and 812, and icons 806 and 808, audible indicators may be used.

As illustrated, communication device 202 in this example may be used to pay a particular provider a sum of money for goods, e.g., groceries. As part of this transaction, a question appears in display 804 asking consumer 200 whether the amount of the payment should be submitted. Consumer 200 also is told that this submission can be effected by activating biometric device 210. If consumer 200 wishes to make this payment, consumer 200 simply places his or her finger on the sensor associated with fingerprint analyzer 814. If the generated UIT matches the UIT for consumer 200 stored in database 250, LED 810 is lighted to inform consumer 200 that verification of his or her identity was successful. On the other hand, if the generated UIT does not match the UIT for consumer 200 stored in the database 250, LED 812 is lighted to inform consumer 200 that verification of his or her identity was not successful. If the verification was successful, a verification signal or a verification code are transmitted with a signal authorizing the making of this payment. On the other hand, if consumer 200 wishes to cancel submission of the payment, he or she touches icon 806, if display 804 is touch sensitive, or otherwise responds to this icon. Prior to submission, icon 808 remains lighted until the sensor associated with fingerprint analyzer 814 is activated. Upon activation of fingerprint analyzer 814, this icon goes dark. If submission of the payment is to be made without verification by the biometric device, consumer 200 may simply touch icon 808 to authorize this payment, again assuming display 804 is touch sensitive.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for effecting a transaction between a person and a provider over a network, said method comprising:

storing, in a database, a plurality of unique biometric traits of the person and a plurality of provider files, the plurality of provider files being respectively associated with a plurality of providers and with the plurality of unique biometric traits such that each one of the plurality of provider files is unique to at most one of the plurality of providers and to at most one of the plurality of unique biometric traits;

establishing a communication link over said network between a communication device and a selected one of said plurality of providers;

acquiring, at said communication device, at least one purchase selection provided by the person;

transmitting, from said communication device to said selected provider, the at least one purchase selection;

receiving, at said communication device from said selected provider, an order form for carrying out a transaction based on the at least one selection;

generating, using a biometric device, a unique biometric trait associated with the person;

comparing, at said biometric device, the generated unique biometric trait to the plurality of unique biometric traits stored in the database; and in response to determining that the generated unique biometric trait substantially matches one of the stored unique biometric traits, automatically locating in the database, using the matched one of the stored unique biometric traits, the corresponding one of the plurality of provider files, retrieving, from the located one of the plurality of provider files, a credit card number and personal information associated with the person and with the corresponding one of the plurality of providers, automatically completing, at said communication device, the received order form using the retrieved credit card number and the retrieved personal information, and automatically transmitting, to the provider from said communication device, the completed form and a verification code.

2. A method as in claim 1, wherein
said communication device is selected from the group consisting of a wireless communication device and a wired communication device,
said wireless communication device being further selected from the group consisting of a PDA, a cell phone, a satellite broadcasting receiver terminal, and a portable computer, and
said wired communication device being further selected from the group consisting of a personal computer, a server computer, a point-of-sale terminal, an automatic teller machine (ATM), a cable receiver terminal, and a landline telephone.

3. A method as in claim 1, wherein said biometric device comprises a fingerprint analyzer, and said generated unique identification trait and said plurality of stored unique identification traits include data identifying a plurality of fingerprints.

4. A method as in claim 1, wherein the verification code is associated with the person.

5. A method as in claim 1, further comprising providing at least one of a visual indication and an audible indication that directs said person to cause said biometric device to perform said generating step.

6. A method as in claim 1, wherein the verification code authorizes said provider to complete said transaction.

7. A communication device, comprising:
a database that stores a plurality of unique biometric traits of the person and a plurality of provider files, the plurality of provider files being respectively associated with a plurality of providers and with the plurality of unique biometric traits such that each one of the plurality of provider files is unique to at most one of the plurality of providers and to at most one of the plurality of unique biometric traits;
a network connection device that establishes a communication link over a network with a selected one of the plurality of providers;
an input device that acquires at least one purchase selection provided by the person;
said network connection device transmits the at least one purchase selection to said selected provider, and receives from said selected provider an order form for carrying out a transaction based on the at least one purchase selection;
a biometric device that generates a unique biometric trait associated with the person and compares the generated unique biometric trait to the plurality of unique biometric traits stored in the database; and
a processor that, in response to determining that the generated unique biometric trait substantially matches one of the stored unique biometric traits, automatically locates the corresponding one of the plurality of provider files in the database, retrieves from the located one of the plurality of provider files a credit card number and personal information associated with the person and with the corresponding one of the plurality of providers, automatically completes the received order form using the retrieved credit card number and the retrieved personal information, and automatically causes said network connection device to transmit to the provider the completed form and a verification signal.

8. A communication device as in claim 7, wherein
said communication device is selected from the group consisting of a wireless communication device and a wired communication device,
said wireless communication device being further selected from the group consisting of a PDA, a cell phone, a satellite broadcasting receiver terminal, and a portable computer, and
said wired communication device being further selected from the group consisting of a personal computer, a server computer, a point-of-sale terminal, an automatic teller machine (ATM), a cable receiver terminal, and a landline telephone.

9. A communication device as in claim 7, wherein said biometric device comprises a fingerprint analyzer, and said generated unique identification trait and said plurality of stored unique identification traits include data identifying a plurality of fingerprints.

10. A communication device as in claim 7, wherein the verification code is associated with the person.

11. A communication device as in claim 7, wherein the verification code authorizes the provider to complete the transaction.

* * * * *